(12) United States Patent
Sato et al.

(10) Patent No.: US 11,548,281 B2
(45) Date of Patent: Jan. 10, 2023

(54) PRINTING METHOD AND PRINTING APPARATUS

(71) Applicant: SEIKO EPSON CORPORATION, Tokyo (JP)

(72) Inventors: Hiroki Sato, Nagano (JP); Akito Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 17/131,856

(22) Filed: Dec. 23, 2020

(65) Prior Publication Data

US 2021/0197564 A1 Jul. 1, 2021

(30) Foreign Application Priority Data

Dec. 25, 2019 (JP) .............................. JP2019-234105

(51) Int. Cl.
*B41J 2/14* (2006.01)
*B41J 2/21* (2006.01)

(52) U.S. Cl.
CPC .......... *B41J 2/1433* (2013.01); *B41J 2/2139* (2013.01)

(58) Field of Classification Search
CPC ........ B41J 2/2139; B41J 2/165; B41J 2/2125; B41J 2/2142
See application file for complete search history.

(56) References Cited

U.S. PATENT DOCUMENTS

| 2003/0048326 A1* | 3/2003 | Yamasaki ............. B41J 2/2132 347/41 |
| 2015/0258785 A1 | 9/2015 | Sudo et al. |
| 2017/0282541 A1* | 10/2017 | Sato .................... B41J 2/04508 |

FOREIGN PATENT DOCUMENTS

JP 2015-174395 A 10/2015

* cited by examiner

*Primary Examiner* — Jason S Uhlenhake
(74) *Attorney, Agent, or Firm* — Global IP Counselors, LLP

(57) ABSTRACT

A printing method for performing printing while complementing black with composite black, the printing method including: printing a test pattern having a plurality of patch images for which composite mode varies, this test pattern being printed for each dot size of the black to be complemented; causing a user to select a desired patch image from among the plurality of patch images included in the printed test pattern, the selection being made for each of the dot size of the black ink to be complemented; and performing printing while complementing the black to be complemented with the composite black generated on a basis of the composite mode corresponding to the desired patch image selected correspondingly to the dot size of the black ink to be complemented.

6 Claims, 9 Drawing Sheets

COMPOSITE MODE FOR COMPLEMENTING SMALL DOT

| COMBINATION NO. (PATCH IMAGE NO.) | DOT SIZE | | |
|---|---|---|---|
| | C | M | Y |
| 1 | SMALL | SMALL | SMALL |
| 2 | MEDIUM | SMALL | SMALL |
| 3 | LARGE | SMALL | SMALL |
| 4 | SMALL | MEDIUM | SMALL |
| 5 | SMALL | LARGE | SMALL |
| 6 | SMALL | SMALL | MEDIUM |
| 7 | SMALL | SMALL | LARGE |

FIG. 5

COMPOSITE MODE FOR COMPLEMENTING MIDDLE DOT

| COMBINATION NO. (PATCH IMAGE NO.) | DOT SIZE | | |
|---|---|---|---|
| | C | M | Y |
| 1 | MEDIUM | MEDIUM | MEDIUM |
| 2 | SMALL | MEDIUM | MEDIUM |
| 3 | LARGE | MEDIUM | MEDIUM |
| 4 | MEDIUM | SMALL | MEDIUM |
| 5 | MEDIUM | LARGE | MEDIUM |
| 6 | MEDIUM | MEDIUM | SMALL |
| 7 | MEDIUM | MEDIUM | LARGE |

FIG. 6

COMPOSITE MODE FOR COMPLEMENTING LARGE DOT

| COMBINATION NO. (PATCH IMAGE NO.) | DOT SIZE | | |
|---|---|---|---|
| | C | M | Y |
| 1 | LARGE | LARGE | LARGE |
| 2 | SMALL | LARGE | LARGE |
| 3 | MEDIUM | LARGE | LARGE |
| 4 | LARGE | SMALL | LARGE |
| 5 | LARGE | MEDIUM | LARGE |
| 6 | LARGE | LARGE | SMALL |
| 7 | LARGE | LARGE | MEDIUM |

FIG. 7

COMPOSITE MODE FOR COMPLEMENTING SMALL DOT

| COMBINATION NO. (PATCH IMAGE NO.) | DOT SIZE | | |
|---|---|---|---|
| | C | M | Y |
| 1 | SMALL | SMALL | SMALL |
| 2 | MEDIUM | SMALL | SMALL |
| 4 | SMALL | MEDIUM | SMALL |
| 6 | SMALL | SMALL | MEDIUM |

FIG. 9

COMPOSITE MODE FOR COMPLEMENTING MIDDLE DOT

| COMBINATION NO. (PATCH IMAGE NO.) | DOT SIZE | | |
|---|---|---|---|
| | C | M | Y |
| 1 | MEDIUM | MEDIUM | MEDIUM |
| 2 | SMALL | MEDIUM | MEDIUM |
| 4 | MEDIUM | SMALL | MEDIUM |
| 6 | MEDIUM | MEDIUM | SMALL |

FIG. 10

PRINTING METHOD AND PRINTING APPARATUS

The present application is based on, and claims priority from JP Application Serial Number 2019-234105, filed on Dec. 25, 2019, the disclosure of which is hereby incorporated by reference herein in its entirety.

BACKGROUND

1. Technical Field

The present disclosure relates to a printing method configured to discharge, to a printing medium, a black ink or a plurality of color inks as ink droplets to perform printing, and also relates to a printing apparatus that allows printing using the printing method.

2. Related Art

JP-A-2015-174395 describes an inkjet printer that can suppress noticeable streaking occurring in a print image due to a defective nozzle that produces defective formation of a black dot. At the time of using a dot by a normal nozzle to complement a dot by the defective nozzle, this inkjet printer discharges a color ink droplet that forms complementary composite black dot, from a nozzle of color onto a dot-missing pixel, and also discharges a black ink droplet that forms a complementary black dot, from a nozzle of black onto adjacent pixels.

However, in a case of the inkjet printer described in JP-A-2015-174395, a hue of composite black generated by the color ink droplet varies depending on specifications of a printing medium, which leads to insufficient complementing of the missing pixel of a black ink depending of types of printing media that a user uses. In other words, there is a problem, for example, in which the inkjet printer may fail to sufficiently make less noticeable the streaking occurring in a print image due to a defective nozzle.

SUMMARY

A printing method according to the present application provides a printing method for printing a print image using a plurality of dots formed by discharging, by a printing head, an ink droplet on a printing medium while relatively moving the printing head and the printing medium in a relative movement direction, the printing head being configured to discharge, on the printing medium, a black ink and inks of a plurality of colors each as the ink droplet, the printing method including: a test pattern printing step of printing a test pattern having a plurality of patch images using different composite mode for each of the dot sizes of the black ink to be complemented, the composite mode being a combination of a dot size of each of the inks of the plurality of colors used to generate composite black that complements the black, the composite black being obtained by combining ink droplets of the discharged inks of the plurality of colors; a selection receiving step of causing a user to select a desired patch image from among a plurality of the patch images included in the printed test pattern, and receiving a result of selection made by the user, the selection being made for each of the dot sizes of the black ink to be complemented; and a printing step of performing printing while complementing the black to be complemented with the composite black generated on a basis of the composite mode corresponding to the desired patch image selected correspondingly to the dot size of the black ink to be complemented.

In addition, a printing method according to the present application provides a printing method for printing a print image using a plurality of dots formed by discharging, by a printing head, an ink droplet on a printing medium while relatively moving the printing head and the printing medium in a relative movement direction, the printing head being configured to discharge, on the printing medium, a black ink and inks of a plurality of colors each as the ink droplet, the printing method including: a test pattern printing step of printing a test pattern having a plurality of patch images using different composite mode for each of the dot sizes of the black ink to be complemented, the composite mode being a combination of a dot size of each of the inks of the plurality of colors used to generate composite black that complements the black, the composite black being obtained by combining ink droplets of the discharged inks of the plurality of colors; automatic selection step of capturing the printed test pattern as image data, and selecting, as a desired patch image, a patch image for which a difference in color between the black and the composite black is determined to be minimum by image processing, the selection being made from among the plurality of patch images included in the printed test pattern, the selection being made for each of the dot sizes of the black ink to be complemented; and a printing step of performing printing while complementing the black to be complemented with the composite black generated on a basis of the composite mode corresponding to the desired patch image selected correspondingly to the dot size of the black ink to be complemented.

In addition, a printing apparatus according to the present application provides a printing apparatus including: a printing head that discharges, as an ink droplet, each of a black ink and inks of a plurality of colors on a printing medium; a moving unit that relatively moves the printing head and the printing medium; a control unit that controls the printing head and the moving unit; and a user interface that provides and receives information between the control unit and a user, the printing apparatus being configured to combine ink droplets of the discharged inks of the plurality of colors to perform printing using composite black that complements the black, wherein the control unit prints a test pattern having a plurality of patch images using different composite mode for each of the dot sizes of the black ink to be complemented, the composite mode being a combination of a dot size of each of the inks of the plurality of colors used to generate the composite black, the control unit causes a user to select a desired patch image from among a plurality of the patch images included in the printed test pattern, and receives a result of selection made by the user, the selection being made through the user interface for each of the dot sizes of the black ink to be complemented, and the control unit performs printing while complementing the black to be complemented with the composite black generated on a basis of the composite mode corresponding to the desired patch image selected correspondingly to the dot size of the black ink to be complemented.

BRIEF DESCRIPTION OF THE DRAWINGS

FIG. 5 is a table showing an example of a plurality of composite modes when a dot size of black to be complemented is small.

FIG. 6 is a table showing an example of a plurality of composite modes when a dot size of black to be complemented is middle.

FIG. 7 is a table showing an example of a plurality of composite modes when a dot size of black to be complemented is large.

FIG. 9 is a table showing an example of a plurality of composite modes when a dot size of black to be complemented is small in a second embodiment.

FIG. 10 is a table showing an example of a plurality of composite modes when a dot size of black to be complemented is middle in the second embodiment.

DESCRIPTION OF EXEMPLARY EMBODIMENTS

1. First Embodiment

Figure 1:
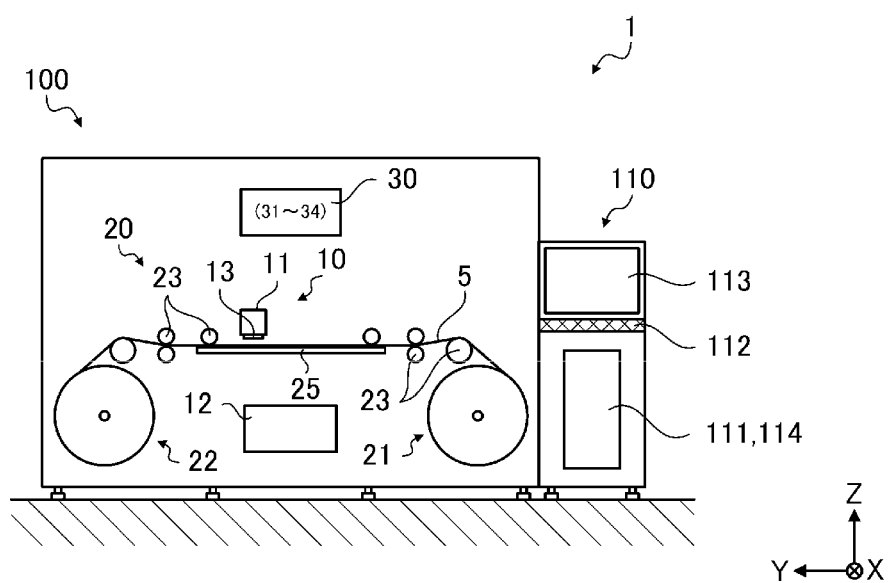
FIG. 1 is a front view illustrating a configuration of a printing apparatus according to a first embodiment.
Figure 2:
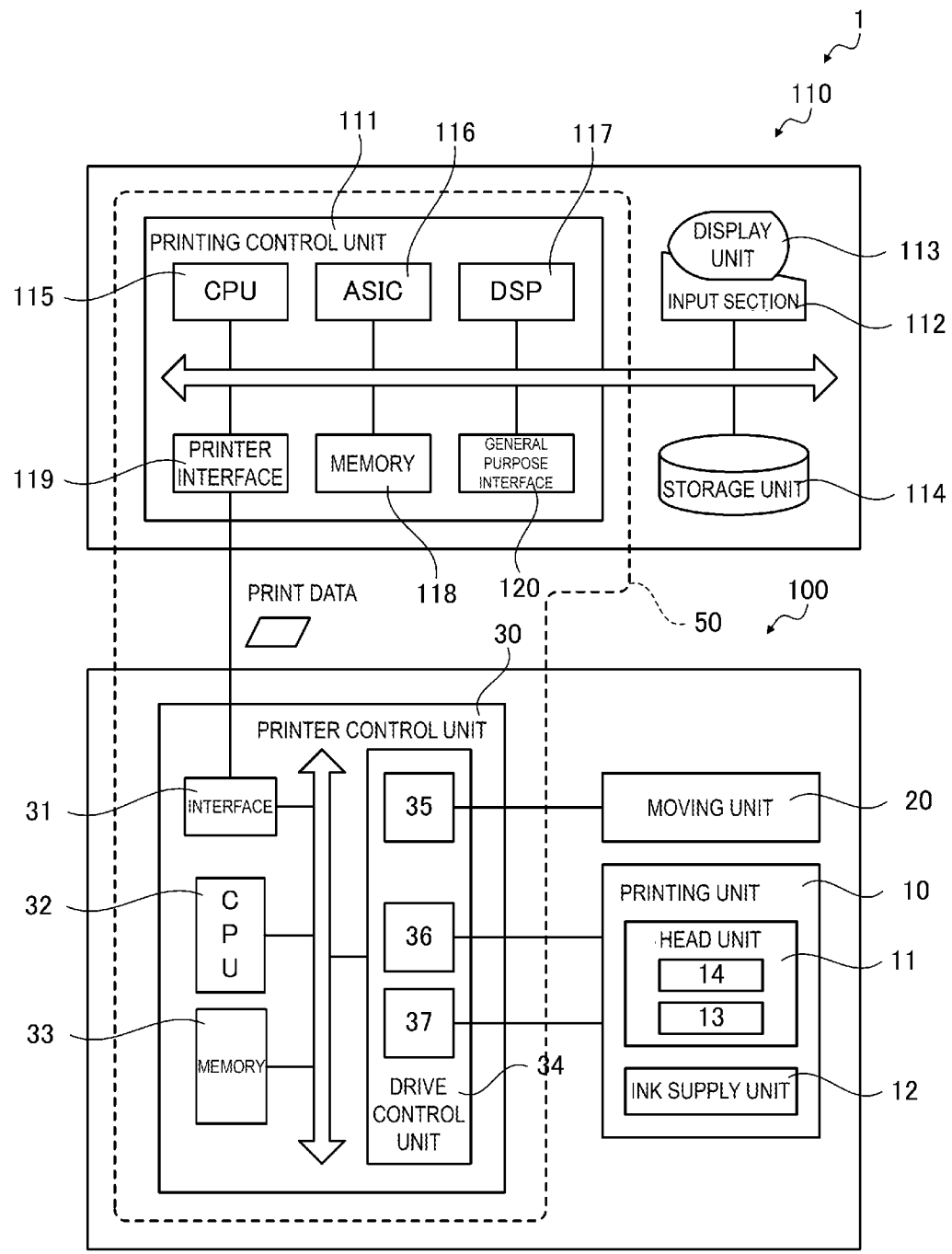
FIG. 2 is a block diagram illustrating a configuration of the printing apparatus according to the first embodiment.

A configuration of a printing system 1 serving as a printing apparatus according to a first embodiment will be described with reference to FIGS. 1 and 2.

It should be noted that the coordinates are given in the drawings such that the Z-axis direction is set as the up-down direction, the +Z direction is set as the upper direction, the X-axis direction is set as the front-rear direction, the −X direction is set as the front direction, the Y-axis direction is set as the left-right direction, the +Y direction is set as the left direction, and the X-Y plane is set as the horizontal plane.

The printing system 1 includes a printer 100, and an image processing apparatus 110 coupled to the printer 100. The printer 100 is a line-head-type inkjet printer that prints a desired image on a printing medium 5 supplied in a wound state in a form of roll, the printing being based on print data received from the image processing apparatus 110. For example, the printing medium 5 used may include woodfree paper, cast-coated paper, art paper, coat paper, and synthetic paper.

The image processing apparatus 110 includes a printing control unit 111, an input unit 112, a display unit 113, a storage unit 114, and the like, and controls print jobs for causing the printer 100 to perform printing. In a preferred example, the image processing apparatus 110 is configured using a personal computer.

Software operated by the image processing apparatus 110 includes general image processing application software that deals with image data used to perform printing, and printer driver software that generates print data used to control the printer 100 or cause the printer 100 to perform printing. In the following description, the image processing application software is simply referred to as an image processing application. In addition, the printer driver software is simply referred to as a printer driver.

Here, the image data represents RGB digital image information, including text data and full-color image data.

The printing control unit 111 includes a CPU 115, an ASIC 116, a DSP 117, a memory 118, a printer interface 119, a general purpose interface 120, and the like, and performs centralized management of the entire printing system 1.

Here, the CPU represents a central processing unit. The ASIC represents an application specific integrated circuit. The DSP represents a digital signal processor. The input unit 112 includes an information input means serving as a user interface. Specifically, the input unit 112 includes, for example, a port or the like to be coupled to a keyboard, a mouse pointer, or an information input device.

The display unit 113 includes an information display means serving as a user interface, and displays information inputted from the input unit 112, an image to be printed on the printer 100, and information related to the print job, and the like, under control of the printing control unit 111.

The storage unit 114 includes a rewritable storage medium such as a hard disk drive or a memory card, and holds a program that operates in the printing control unit 111 serving as software run by the image processing apparatus 110, an image to be printed, or information related to a print job, or the like.

The memory 118 includes a storage medium used to secure a region for holding a program to be run by the CPU 115, a work region in which such a program runs, and the like, and includes a storage element such as a RAM and an EEPROM. Here, the RAM represents a random access memory. The EEPROM represents an electrically erasable programmable read-only memory. The general purpose interface 120 includes, for example, a LAN interface, a USB interface, or other interfaces that are able to be coupled to an external electronic device.

The LAN represents a local area network. The USB represents a universal serial bus.

The printer 100 includes a printing unit 10, a moving unit 20, and a printer control unit 30. The printer 100 that has received print data from the image processing apparatus 110 uses the printer control unit 30 to control the printing unit 10 and the moving unit 20 on the basis of the print data to print an image on the printing medium 5.

The print data is image formation data obtained by converting the image data so that the printer 100 can perform printing using the image processing application and the printer driver included in the image processing apparatus 110, and includes a command for controlling the printer 100.

The printing unit 10 includes a head unit 11, an ink supply unit 12, and the like.

The moving unit 20 includes a supply unit 21, an accommodating portion 22, a transport roller 23, a platen 25, and the like.

The head unit 11 includes a printing head 13 including a plurality of nozzles rows in which a plurality of nozzles each discharging a printing ink as an ink droplet is arranged, and also includes a head control unit 14. Under the control of the printer control unit 30, the printing head 13 included in the head unit 11 discharges ink droplets onto the printing medium 5 supported by the platen 25 to form, on the printing medium 5, a plurality of dot rows corresponding to the nozzle rows. The dot rows are formed while the printing medium 5 is being moved relatively to the printing head 13 using the moving unit 20, to print a desired image based on the image data.

Note that, in the present embodiment, the printing control unit 111 and the printer control unit 30 constitutes a control unit 50 that controls the printing head 13 and the moving unit 20 on the basis of the image data to perform printing.

The ink supply unit 12 includes, for example, an ink tank, and an ink supply path used to supply an ink from the ink tank to the printing head 13. The ink supply path is not illustrated in the drawings.

As for the ink, an ink set of four colors is used. The four colors is made out of an ink set of three colors and black K. The three colors are cyan C serving as a cyan-based ink, magenta M serving as a magenta-based ink, and yellow Y serving as a yellow-based ink. The ink tank, the ink supply path, and an ink supply channel up to nozzles that discharge the same ink are provided separately for each ink.

A piezo method is used for an ink-jet method of discharging ink droplets. The piezo method is a printing method in which a pressure corresponding to a printing information signal is applied to an ink stored in a pressure generating chamber by an actuator using a piezo element serving as a piezoelectric element to eject ink droplets from a nozzle communicating with the pressure generating chamber.

Note that the method of discharging ink droplets is not limited to this, and other printing methods may be used in which droplets of ink are ejected in a droplet form to form a group of dots on a printing medium.

The moving unit 20 moves the printing medium 5 relatively to the printing head 13 under the control of the printer control unit 30.

The supply unit 21 rotatably supports a reel on which the printing medium 5 is wounded into a roll, and feeds the printing medium 5 into the transport path. The accommodating portion 22 rotatably supports a reel on which the printing medium 5 is wound, and winds, from the conveying path, the printing medium 5 on which printing has been completed.

The transport roller 23 includes a driving roller that causes the printing medium 5 to move on an upper surface of the platen 25 in the Y-axis direction, and also includes a driven roller that rotates in association with the movement of the printing medium 5 and the like. The transport roller 23 constitutes a transport path in which the printing medium 5 is transported from the supply unit 21 through a printing region of the printing unit 10 to the accommodating portion 22. The print region is a region on the upper surface of the platen 25 where the printing head 13 ejects an ink to cause it to land on the printing medium 5.

Note that, in the present embodiment, the relative movement direction in which the printing head 13 and the printing medium 5 move relatively to each other is the transport direction of the printing medium 5 in the print region and is the Y-axis direction.

The printer control unit 30 includes an interface 31, a CPU 32, a memory 33, a drive control unit 34, and the like, and controls the printer 100.

The interface 31 is coupled to the printer interface 119 of the image processing apparatus 110 to allow data to be transmitted and received between the image processing apparatus 110 and the printer 100.

The CPU 32 is an arithmetic processing unit for overall control of the printer 100.

The memory 33 is a storage medium used to secure a region for storing programs run by the CPU 32, a work region in which such programs run, and the like, and includes storage elements such as a RAM and an EEPROM.

The CPU 32 controls the printing unit 10 and the moving unit 20 through the drive control unit 34 in accordance with the program stored in the memory 33 and the print data received from the image processing apparatus 110.

The drive control unit 34 includes firmware that operates on the basis of control of the CPU 32 to control driving of the head unit 11 and the ink supply unit 12 of the printing unit 10, and the moving unit 20. The drive control unit 34 includes drive control circuits including a moving-control-signal generating circuit 35, a discharge-control-signal generating circuit 36, and a drive-signal generating circuit 37, and also includes a ROM, a flash memory, and other elements that include firmware that controls these drive control circuits. The ROM and the flash memory that include firmware that controls the drive control circuits are not illustrated in the drawings. Here, the ROM represents a read-only memory.

The moving-control-signal generating circuit 35 is a circuit that generates a signal used to control the moving unit 20 in accordance with an instruction given from the CPU 32 on the basis of the print data.

The discharge-control-signal generating circuit 36 is a circuit that generates a head control signal used to select a nozzle for discharging an ink, select the amount of discharge, control the timing of discharge, and the like, in accordance with an instruction given from the CPU 32 on the basis of the print data.

The drive-signal generating circuit 37 is a circuit that generates a drive waveform used to drive a pressure generating unit included in the printing head 13 used to discharge an ink.

Figure 3:
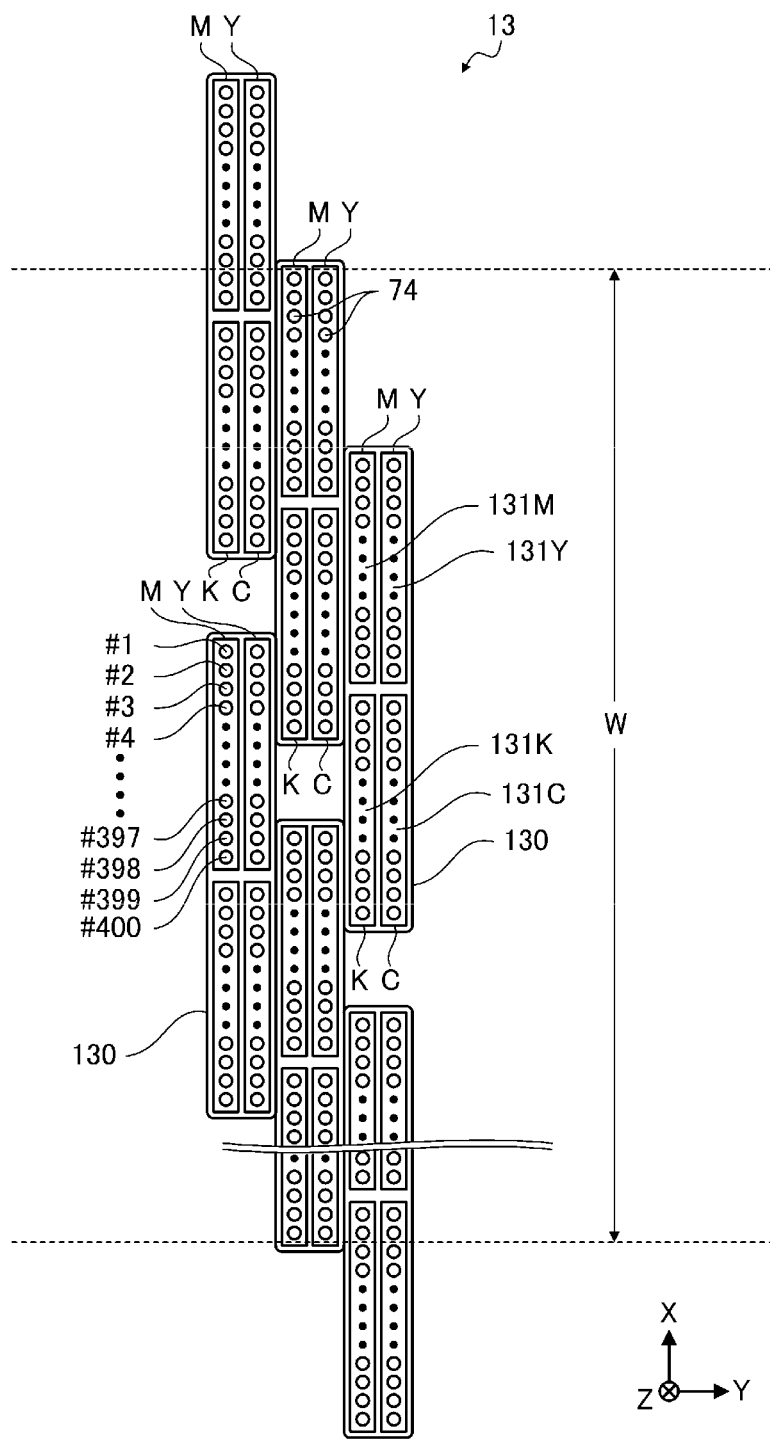
FIG. 3 is a schematic view illustrating an example of arrangement of nozzles as viewed from a lower surface of a printing head.

Next, an example of a configuration of the printing head 13 will be described with reference to FIG. 3.

The printing head 13 includes a plurality of head blocks 130 that can discharge inks of four colors: black K, cyan C, magenta M, and yellow Y. The printing head 13 is configured such that a plurality of nozzles 74 that discharge inks of individual colors is arranged across a length W that exceeds the maximum width of the printing medium 5.

The head block 130 includes four head chips 131: a head tip 131C that discharges an ink of cyan C, a head chip 131M that discharges an ink of magenta M, a head chip 131Y that discharges an ink of yellow Y, and a head chip 131K that discharges a black ink K, in order to allow inks of four colors to be discharged. These four head chips 131 are arranged in two rows and two columns in the head block 130. Specifically, the head tip 131C and the head chip 131Y are arranged in the X-axis direction, and in the next column in the Y-axis direction, the head tip 131M and the head chip 131K are arranged in the X-axis direction.

Each of the head chips 131 includes a nozzle row in which four hundreds nozzles 74 from #1 to #400 are arranged at constant intervals along the X-axis direction.

For example, the head chip 131 uses a silicon wafer as a base material, and is manufactured though a MEMS manufacturing process to which semiconductor processing is applied. The nozzles 74 of one head chip 131 constitute a nozzle group and have the same ink discharging property or have ink discharging properties very close to each other. Here, the MEMS represents micro electro mechanical systems.

Furthermore, the head blocks 130 are arranged such that part of the nozzles 74 of each of the head chips 131 overlap with each other in order to avoid printing performed in a manner such that an influence of joining portions of the individual head chips 131 is visually recognized. Specifically, as illustrated in FIG. 3, the head blocks 130 are arranged in the Y-axis direction so that three columns of the head blocks 130 overlap with each other. In addition, in the X-axis direction, the head blocks 130 are arranged such that, over the width direction of the printing medium 5, groups of two nozzles 74 located at each of both ends of each of the head chips 131 in the X-axis direction are aligned at a position shifted so that the two nozzles 74 overlap with the other two nozzles 74 in the Y-axis direction, these head chips 131 having the same color and overlapping with each other in the Y-axis direction.

The head control unit 14 is controlled by the printer control unit 30 on the basis of the print data, to drive the printing head 13. Each of the nozzles 74 can discharge ink droplets that can form a dot having a small size, a dot having a middle size greater than the small size, and a dot having a large size greater than the middle size, in accordance with a drive signal used to drive the printing head 13. A configuration of the head control unit 14 will not be described.

The printer control unit 30 performs an operation of discharging an ink droplet from the printing head 13 while using the transport roller 23 to move the printing medium 5 supplied by the supply unit 21 and the transport roller 23 into the print region in the Y-axis direction, thereby printing a desired image on the printing medium 5.

In addition, the printing head 13 combines ink droplets of cyan C, magenta M, and yellow Y, thereby being able to generate composite black Bk that complements black K under the control of the control unit 50, specifically, under the drive control of the head control unit 14 controlled by the control of the printer control unit 30 on the basis of print data generated by the printing control unit 111.

For example, when one nozzle 74 in any one of head chips 131K becomes defective in discharging, a dot is formed by combining ink droplets of inks of cyan C, magenta M, and yellow Y discharged from corresponding nozzles 74 of a head chip 131C, a head chip 131M, and a head chip 131Y each adjacent to the head chip 131K in the Y-axis direction, the corresponding nozzles 74 being aligned on the same Y-axis as the discharge defective nozzle 74. This makes it possible to perform printing using composite black Bk that complements a dot of black K that fails to be discharged.

In addition, for example, when a black ink K cannot be supplied to the printing head 13 due to depletion of the ink of black K or the like, nozzles 74 of head chips 131C, head chips 131M, and head chips 131Y each aligned on the same Y-axis are used in place of nozzles 74 that discharge ink droplets of black K, and form a dot of composite black Bk. This makes it possible to perform printing with black K being complemented.

Next, a printing method according to the present embodiment will be described with reference to the flowchart illustrated in FIG. 4. The printing method described here is a printing method configured such that, when a nozzle 74, which is part of the plurality of nozzles 74 that discharge ink droplets of black K included in the printing head 13, becomes defective in discharging, printing is performed by using composite black Bk to complement a dot-missing pixel occurring in the transport direction of the printing medium 5.

A series of processes until printing is performed includes using functions of the image processing application and the printer driver to cause the display unit 113 to display a necessary user interface screen to a user, and also cause the user to input, from the input unit 112, a necessary instruction related to information displayed on the user interface screen. In other words, the control unit 50 performs a series of processes until printing is performed.

First, in step S1, image data for printing is acquired. Specifically, the image processing apparatus 110 acquires image data to be printed, from an external electronic apparatus through the general purpose interface 120. Alternatively, image data to be printed is selected from among the image data acquired in advance and stored in the storage unit 114.

Next, in step S2, printing parameters are determined. Specifically, by using the functions of the image processing application and the printer driver, the printing parameters are determined. The printing parameters include the size or resolution of a print image, and a printing mode such as sharpness.

Next, in step S3, a nozzle check is performed. The nozzle check is performed to check the presence or absence of a nozzle 74 having a discharge failure, and is performed by controlling the printer control unit 30 using the function of the printer driver. Specifically, a nozzle 74 having a discharge failure can be detected, for example, by using a residual-vibration detection circuit included in the head control unit 14 to detect a residual vibration waveform occurring in a drive signal path when each nozzle 74 is driven to discharge.

Note that the nozzle check does not necessarily have to be performed at each time of printing. For example, this nozzle check is not necessary when a user knows that there is no nozzle 74 having a discharge failure or when, if any failure exists, it is determined that the failure can be ignored in the desired printing.

The results of the nozzle check are displayed on the display unit 113, and the user looks at the results of the nozzle check to give a necessary instruction.

Specifically, when no nozzle 74 having a discharge failure is detected, it is possible to proceed at step S4 to step S13 of generating normal print data used to perform printing. In addition, when the user looks at the results of the nozzle check and a nozzle 74 having a discharge failure is detected, the user is able to give an instruction as to whether or not to clean the nozzle 74 in step S5.

When the nozzle 74 is determined in step S5 to be cleaned, the process proceeds to step S6 to clean the nozzle 74 through flushing or wiping, and then, returns to step S3 to perform nozzle check again.

In the next step S7, when a nozzle 74, which is part of the plurality of nozzles 74 that discharge ink droplets of black K, has a discharge failure, it is possible to select whether or not to perform complement printing in which a dot-missing pixel is complemented with composite black Bk.

When a nozzle 74 having a discharge failure in black K is detected and the user determines that complementing with composite black Bk is not necessary, it is possible to proceed directly to step S13 of generating normal print data used to perform printing.

When complement printing is determined in step S7 to be performed, it is possible to select, in step S8, whether a composite mode is set or a default composite mode is used to perform printing.

Here, the composite mode represents a mode concerning combination of dot sizes of cyan C, magenta M, and yellow Y used to generate the composite black Bk, and is set as a table for each dot size of a black ink K to be complemented.

Note that, when a nozzle 74 of black K is detected to have a discharge failure, the printing control unit 111 stores, in the storage unit 114, location information that can be used to identify which nozzle 74 of black K has a discharge failure. For example, the location information that enables identifying the nozzle 74 of black K having a discharge failure includes the number assigned to a head chip 131K from among the numbers assigned to the plurality of head chips 131K and the number assigned to the nozzle 74 in this head chip 131K, or the number assigned to the nozzle 74 from among numbers sequentially assigned to the entire nozzles 74 of black K included in the printing head 13. The printing control unit 111 can associate the individual nozzles 74 of cyan C, magenta m, and yellow Y that complement the identified nozzle 74 of black K.

When printing is performed using the default composite mode, in other words, when NO is selected in step S8 so that setting of a composite mode is not performed, the dot sizes are set in step S9 for each of inks of cyan C, magenta M, and yellow Y in accordance with the default composite mode set in advance, and the process proceeds to step S12 of generating print data that deals with complementing to perform printing while performing complementing using the set composite mode.

Here, the default composite mode represents conditions that are set as appropriate conditions and are stored in the storage unit 114 on the basis of evaluation made in advance on the printing medium 5 that the printing system 1 is assumed to typically use.

In step S8, when YES is selected to set a composite mode, the subsequent steps allow the user to selectively set a composite mode suitable for specifications of the printing medium 5 to be used. To do so, first, in step S10, a test pattern is printed. The test pattern includes a plurality of patch images based on a composite mode having a plurality of combinations. The next step S11 includes receiving a result of selection of a patch image in the test pattern that the user determines to be the most suitable. The composite mode corresponding to the patch image selected by the user is set as a composite mode used at the time of performing complement printing.

Here, examples of the composite mode that the user can selectively set will be described with reference to FIGS. 5 to 7.

FIG. 5 illustrates an example of a table including a composite mode with seven combinations and corresponding to a case when the dot size of a black ink K is small. The seven combinations include a combination 1 in which all the dot sizes of an ink of cyan C, an ink of magenta M, and an ink of yellow Y have a small size, and also include six combinations ranging from a combination 2 to a combination 7. The six combinations are set such that the dot sizes of two inks from among an ink of cyan C, an ink of magenta M, and an ink of yellow Y have a small size, and the dot size of the remaining one ink has a middle size or a large size.

Furthermore, FIG. 6 illustrates an example of a table including a composite mode with seven combinations and corresponding to a case when the dot size of a black ink K is middle. The seven combinations include a combination 1 in which all the dot sizes of an ink of cyan C, an ink of magenta M, and an ink of yellow Y have a middle size, and also include six combinations ranging from a combination 2 to a combination 7. The six combinations are set such that the dot sizes of two inks from among an ink of cyan C, an ink of magenta M, and an ink of yellow Y have a middle size, and the dot size of the remaining one ink has a small size or a large size.

Furthermore, FIG. 7 illustrates an example of a table including a composite mode with seven combinations and corresponding to a case where the dot size of a black ink K is large. The seven combinations include a combination 1 in which all the dot sizes of an ink of cyan C, an ink of magenta M, and an ink of yellow Y have a large size, and also include six combinations ranging from a combination 2 to a combination 7. The six combinations are set such that the dot sizes of two inks from among an ink of cyan C, an ink of magenta M, and an ink of yellow Y have a large size, and the dot size of the remaining one ink has a small size or a middle size.

Next, description will be made of a configuration of a test pattern including a plurality of patch images based on a composite mode with the plural combinations.

The test pattern includes: a first test pattern T1 in a case when the dot size of a black ink K to be complemented has a small size; a second test pattern T2 in a case when the dot size of a black ink K to be complemented has a middle size; and a third test pattern T3 in a case when the dot size of a black ink K to be complemented has a large size.

In addition, the first test pattern T1, the second test pattern T2, and the third test pattern T3 each have patch images Pn as patch images corresponding to a composite mode with respective plural combinations described above. The "n" ranges from 1 to 7, each of which corresponds to the combination number.

In addition, each of the patch images Pn is a print image in which a first print image G1 and a second print image G2 are alternately arranged in a direction intersecting the relative movement direction. The first print image G1 is made out of dots of a black ink K, and includes a plurality of dot rows extending in the relative movement direction, in other words, in the Y-axis direction. The second print image G2 is made out of composite black Bk, and includes a complementary pixel row extending in the relative movement direction.

Below, specific description will be made with reference to the example of the first test pattern T1 illustrated in FIG. 8.

Figure 8:
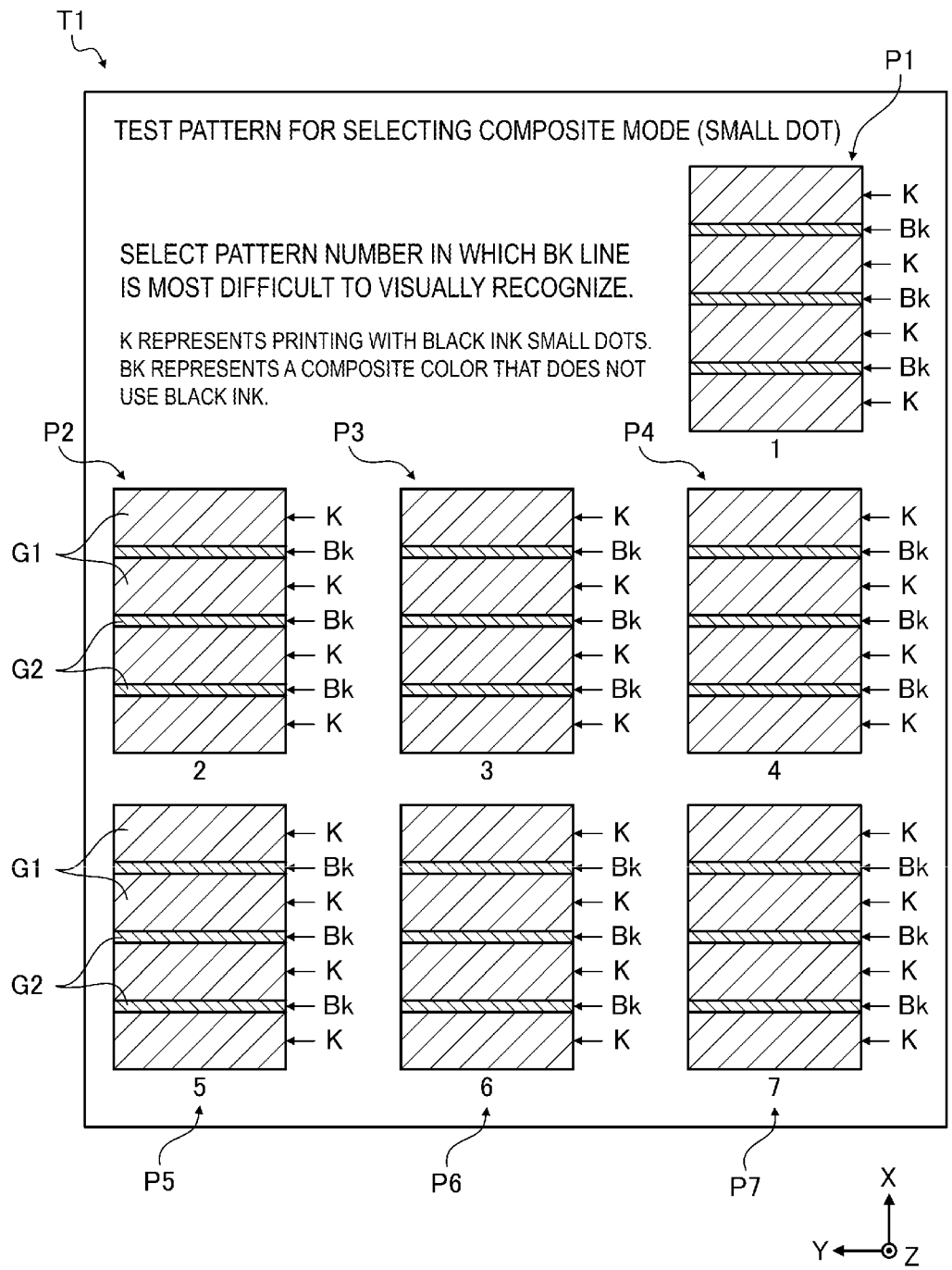
FIG. 8 is a schematic view illustrating an example of a test pattern for selecting a composite mode.

The first test pattern T1 illustrated in FIG. 8 is a test pattern used to select a composite mode of the composite black Bk that complements black K having a small dot size.

The first test pattern T1 has a patch image P1 and patch images P2 to P7. The patch image P1 includes the first print image G1 made out of dots of a black ink K having a small size, and also includes the second print image G2 corresponding to the combination 1 illustrated in FIG. 5 described above and made out of composite black Bk generated using a composite mode in which all the dot sizes of an ink of cyan C, an ink of magenta M, and an ink of yellow Y have a small size. The patch images P2 to P7 each include the first print image G1 made out of dots of a black ink K having a small size, and also include the second print image G2 corresponding to each of the combinations 2 to 7 illustrated in FIG. 5 described above and made out of composite black Bk generated using a composite mode in which the dot sizes of two inks from among an ink of cyan C, an ink of magenta M, and an ink of yellow Y have a small size, and the dot size of the remaining one ink has a middle size or a large size.

The second test pattern T2 has a layout similar to that of the first test pattern T1 illustrated in FIG. 8, and includes a patch image P1 and patch images P2 to P7. The patch image P1 includes the first print image G1 made out of dots of a black ink K having a middle size, and also includes the second print image G2 made out of composite black Bk generated using a composite mode in which all the dot sizes of an ink of cyan C, an ink of magenta M, and an ink of yellow Y have a middle size. The patch images P2 to P7 each include the first print image G1 made out of dots of a black ink K having a middle size, and also include the second print image G2 corresponding to each of the combinations 2 to 7 illustrated in FIG. 6 described above and made out of composite black Bk generated using a composite mode in which the dot sizes of two inks from among an ink of cyan C, an ink of magenta M, and an ink of yellow Y have a middle size, and the dot size of the remaining one ink has a small size or a large size.

The third test pattern T3 has a layout similar to that of the first test pattern T1 illustrated in FIG. 8, and includes a patch image P1 and patch images P2 to P7. The patch image P1 includes the first print image G1 made out of dots of a black ink K having a large size, and also includes the second print image G2 made out of composite black Bk generated using a composite mode in which all the dot sizes of an ink of cyan C, an ink of magenta M, and an ink of yellow Y have a large size. The patch images P2 to P7 each include the first print image G1 made out of dots of a black ink K having a large size, and also include the second print image G2 corresponding to each of the combinations 2 to 7 illustrated in FIG. 7 described above and made out of composite black Bk generated using a composite mode in which the dot sizes of two inks from among an ink of cyan C, an ink of magenta M, and an ink of yellow Y have a large size, and the dot size of the remaining one ink has a middle size or a small size.

Figure 4:
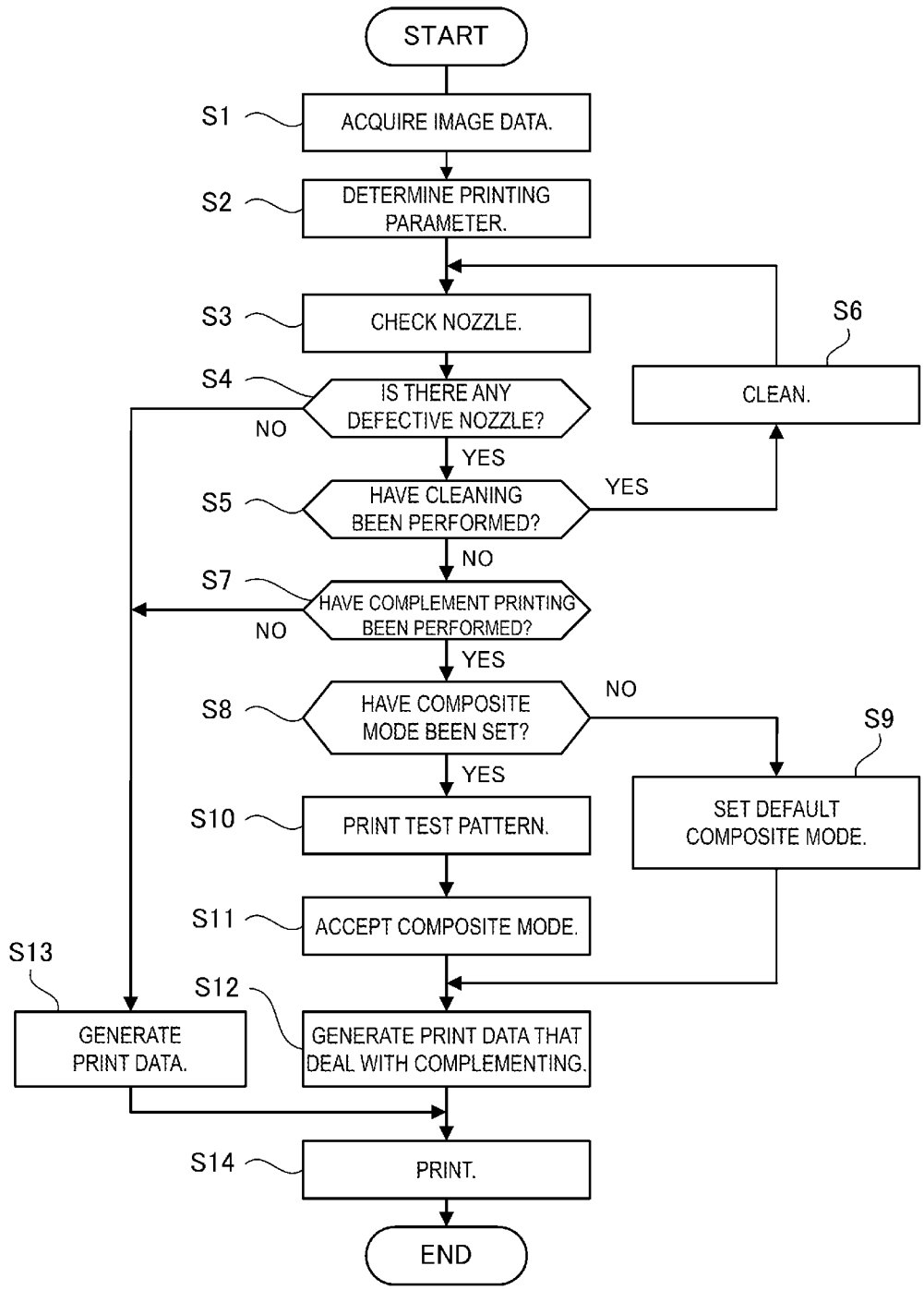
FIG. 4 is a flowchart of a printing method according to the first embodiment.

In other words, in the flowchart of the printing method illustrated in FIG. 4, step S10 provides a test-pattern printing step in which a test pattern having a plurality of patch images Pn for which composite mode varies is printed for each of the dot sizes of a black ink K to be complemented, the composite mode being a combination of dot sizes of inks of a plurality of colors used to generate composite black Bk.

In addition, step S11 provides a selection inputting step in which a user is caused to select a desired patch image Pn from among a plurality of patch images Pn included in the printed test pattern, and a result of selection that the user makes is received, the selection being made for each of the dot sizes of a black ink K to be complemented.

The subsequent step S12 includes generating print data that deals with complementing, the print data being used to perform printing while performing complementing using the set composite mode.

Specifically, by using the function of the printer driver, the print data is generated in a manner such that: a complementary pixel by composite black Bk generated on the basis of a composite mode corresponding to the patch image Pn selected from the first test pattern T1 is generated at a pixel position where a dot having a small size is formed by a nozzle 74 that discharges an ink droplet of black K having a discharge failure; a complementary pixel by composite black Bk generated on the basis of a composite mode corresponding to the patch image Pn selected from the second test pattern T2 is generated at a pixel position where a dot having a middle size is formed by a nozzle 74 that discharges an ink droplet of black K having a discharge failure; and a complementary pixel by composite black Bk generated on the basis of a composite mode corresponding to the patch image Pn selected from the third test pattern T3 is generated at a pixel position where a dot having a large size is formed by a nozzle 74 that discharges an ink droplet of black K having a discharge failure.

In the printing step of step S14 coming after each of step S9, step S12, and step S13, printing is performed on the basis of print data generated in each step.

In other words, when YES is selected in step S8 to set a composite mode, step S14 follows step S12 and provides a printing step configured to perform printing such that black K to be complemented is complemented with composite black Bk generated on the basis of a composite mode corresponding to a desired patch image Pn selected correspondingly to the dot size of an black ink K to be complemented, and printing is performed.

According to the present embodiment, it is possible to obtain the following effects.

In the test-pattern printing step in step S10, a test pattern having a plurality of patch images Pn for which composite mode varies is printed for each dot size of a black ink K to be complemented. In the selection inputting step in step S11, for each dot size of a black ink K to be complemented, a user is caused to select a desired patch image Pn from among the plurality of patch images Pn included in the printed test pattern, and a result of selection that the user makes is received. In addition, in the printing step in step S14, the black K to be complemented is complemented with composite black Bk generated on the basis of a composite mode corresponding to the desired patch image Pn selected by the user for each dot size of the ink of black K to be complemented, and printing is performed. In other words, it is possible to complement black K by using the composite black Bk generated using a composite mode more suitable for a type of the printing medium 5 that the user uses, thereby perform printing. Thus, for example, when a dot-missing pixel by a nozzle 74 having a failure in discharging a black ink K is complemented with composite black Bk to perform printing, it is possible to perform printing in a manner that streaking or the like is made less noticeable at a complemented portion that is more likely to be visually recognized.

Furthermore, in the printing method configured to use the composite black Bk to complement a dot-missing pixel occurring when a nozzle 74, which is part of the plurality of nozzles 74 of the printing head 13 that discharge ink droplets of a black ink K, has a discharge failure, a patch image Pn printed in the test-pattern printing step is a print image in which the first print image G1 and the second print image G2 are alternately arranged in a direction intersecting the relative movement direction, the first print image G1 being made out of a dot of a black ink K and including a plurality of dot rows extending in the relative movement direction, the second print image G2 being made out of composite black Bk and including a complementary pixel row extending in the relative movement direction. In addition, the test pattern includes a plurality of patch images Pn having varied composite modes for composite black Bk that forms the second print image G2. In other words, the test pattern includes a plurality of patch images Pn printed in a manner such that a dot-missing pixel in a form of pseudo-streaking is complemented with a plurality of composite blacks Bk having varied composite modes.

Thus, in the selection inputting step in step S11, a use selects, as a desired patch image Pn, a patch image Pn having the second print image G2 determined to be least likely to be visually recognized as streaking from among the plurality of patch images Pn. Then, composite black Bk is used to complement the dot-missing pixel in which dots made out of ink droplets of a black ink K are not formed continuously in the relative movement direction. This makes it possible to perform printing in a manner such that the streaking is far less likely to be noticeable at a portion complemented with the composite black Bk.

In addition, according to the present embodiment, at the time of selecting a composite mode that determines a hue of composite black Bk, it is possible to select the most suitable composite mode from among up to seven types of composite modes, for each dot size of a black ink K to be complemented, the dot size including a small size, a middle size, and a large size.

2. Second Embodiment

The present embodiment provides a modification example of the first embodiment.

The first embodiment gives an example in which the printing head 13 is able to form a dot having a small size, a dot having a middle size, and a dot having a large size. However, the present embodiment gives an example in which the dot size that the printing head 13 is able to form includes a small size and a middle size. Combinations in a composite mode differ from those of the first embodiment, and hence, the configuration of a test pattern also differs. Below, with reference to FIGS. 9 and 10, description will be made of combinations in a composite mode that a user can select, and also of a configuration of test pattern looked up at the time of selection.

FIG. 9 illustrates an example of a table including a composite mode with four combinations and corresponding to a case when the dot size of a black ink K is small. The four combinations include a combination 1 in which all the dot sizes of an ink of cyan C, an ink of magenta M, and an ink of yellow Y have a small size, and also include three combinations: a combination 2, a combination 4, and a combination 6. The three combinations are set such that the dot sizes of two inks from among an ink of cyan C, an ink of magenta M, and an ink of yellow Y have a small size, and the dot size of the remaining one ink has a middle size.

In addition, FIG. 10 illustrates an example of a table including a composite mode with four combinations and corresponding to a case when the dot size of a black ink K is middle. The four combinations include a combination 1 in which all the dot sizes of an ink of cyan C, an ink of magenta M, and an ink of yellow Y have a middle size, and also include three combinations: a combination 2, a combination 4, and a combination 6. The three combinations are set such that the dot sizes of two inks from among an ink of cyan C, an ink of magenta M, and an ink of yellow Y have a middle size, and the dot size of the remaining one ink has a small size.

Furthermore, the test pattern includes: a first test pattern T1 in a case when the dot size of a black ink K to be complemented has a small size; and a second test pattern T2 in a case when the dot size of a black ink K to be complemented has a middle size.

The first test pattern T1 according to the present embodiment has a patch image P1 and patch images P2, P4, and P6. The patch image P1 includes a first print image G1 made out of dots of a black ink K having a small size, and also includes a second print image G2 made out of composite black Bk generated using a composite mode in which all the dot sizes of an ink of cyan C, an ink of magenta M, and an ink of yellow Y have a small size. The patch images P2, P4, and P6 each include a first print image G1 made out of dots of a black ink K having a small size, and also include a second print image G2 made out of composite black Bk generated using a composite mode in which the dot sizes of two inks from among an ink of cyan C, an ink of magenta M, and an ink of yellow Y have a small size, and the dot size of the remaining one ink has a middle size.

The second test pattern T2 according to the present embodiment has a patch image P1 and patch images P2, P4, and P6. The patch image P1 includes a first print image G1 made out of dots of a black ink K having a middle size, and also includes a second print image G2 made out of composite black Bk generated using a composite mode in which all the dot sizes of an ink of cyan C, an ink of magenta M, and an ink of yellow Y have a middle size. The patch images P2, P4, and P6 each include a first print image G1 made out of dots of a black ink K having a middle size, and also include a second print image G2 made out of composite black Bk generated using a composite mode in which the dot sizes of two inks from among an ink of cyan C, an ink of magenta M, and an ink of yellow Y have a middle size, and the dot size of the remaining one ink has a small size.

According to the present embodiment, at the time of selecting a composite mode that determines a hue of composite black Bk, it is possible to select the most suitable composite mode from among up to four types of composite modes, for each dot size of a black ink K to be complemented, the dot size including a small size, and a middle size.

3. Third Embodiment

The present embodiment provides a modification example of the first embodiment. The first embodiment describes that, in the selection inputting step in step S11, a user is caused to select a desired patch image Pn from among the plurality of patch images Pn included in a printed test pattern, the selection being made for each dot size of a black ink K to be complemented, and a result of selection that the user makes is accepted. However, automatic selection using image processing may be possible.

Specifically, instead of the selection inputting step according to the first embodiment, step S11 provides an automatic selection step in which a printed test pattern is captured as image data using a line scanner or the like, and image processing is used to select, as a desired patch image, a patch image Pn for which a difference in color between black and composite black is determined to be minimum, the selection being made from among a plurality of patch images Pn included in the printed test pattern, the selection being made for each dot size of a black ink to be complemented.

In the image processing, a difference in color between the first print image G1 and the second print image G2 is numerically determined, which makes it possible to select the most suitable composite mode. As for the numerical determination on the difference in color, it is possible to use, for example, a color difference $\Delta E^* ab$ in a CIE $L^* a^* b^*$ color system proposed in 1976.

In the present embodiment, complementing is performed using composite black Bk generated using a composite mode that corresponds to a patch image Pn for which a difference in color between black and composite black is determined to be minimum, and printing is performed. In other words, it is possible to complement the black K by using composite black Bk generated using a composite mode more suitable for a type of the printing medium 5 that the user uses, thereby perform printing. Thus, for example, when the composite black Bk is used to complement a dot-missing pixel by a nozzle 74 having a failure in discharging a black ink K to perform printing, it is possible to perform printing in a manner that streaking or the like is made less noticeable at a complemented portion that is more likely to be visually recognized.

Figure 11:
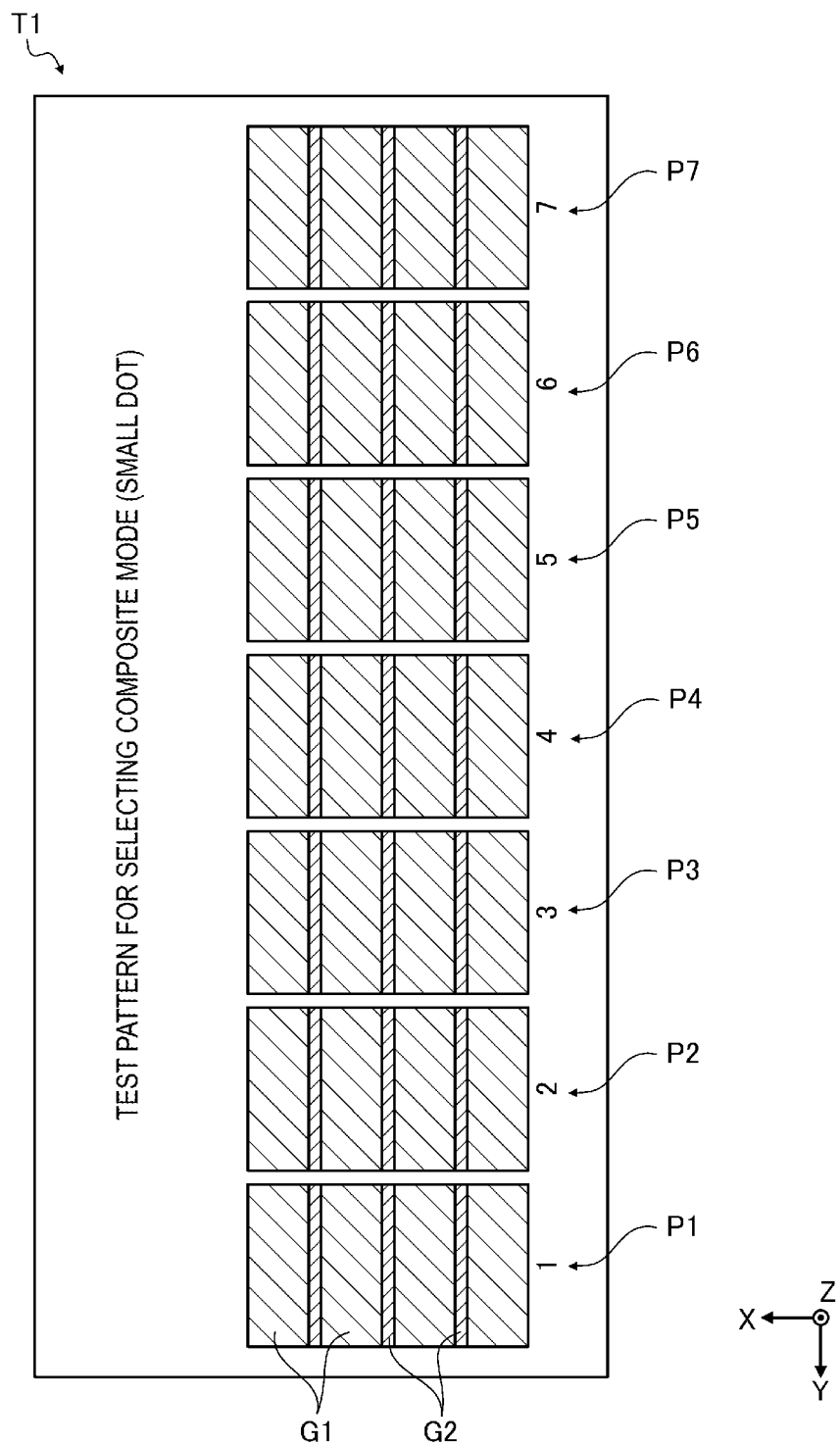
FIG. 11 is a schematic view illustrating an example of a layout configuration of a test pattern according to a third embodiment.

Furthermore, in the test-pattern printing step of step S10 in the printing method according to the present embodiment, patch images Pn are printed so as to be arranged in one line in the relative movement direction, in other words, in the Y-axis direction. In addition, second print images G2 at each of the patch images Pn arranged into one line are printed at the same positions in the X-axis direction intersecting the relative movement direction, as illustrated in FIG. 11.

This layout configuration of the test pattern is an example of a configuration that is convenient when image data on the test pattern is captured using a line scanner or the like to select a patch image Pn using image processing.

With this test pattern, in a case where a line scanner or other imaging elements arranged in a direction intersecting the relative movement direction are used to perform a process of capturing an image while scanning the imaging elements in the relative movement direction with respect to the test pattern at the time of printing the test pattern to select a desired patch image Pn, it is possible to image the second print image G2 in the same region within the imaging element. This makes it possible to reduce the influence of errors associated with image capturing.

4. Fourth Embodiment

The present embodiment is a modification example of the first embodiment, and includes a test-pattern-mode inputting step before the test-pattern printing step in the printing method according to the first embodiment. In the test-pattern-mode inputting step, it is possible to accept at least one setting from among a composite mode, array of patch images, and arrangement of first print images G1 and second print images G2 in a patch image, each of which serves as setting of printing parameters for the test pattern.

In the test-pattern-mode inputting step, the function of inputting setting of printing parameters for the test pattern can be achieved as a function of a printer driver by enabling input from the input unit 112 through a user interface screen displayed by the display unit 113.

Specifically, in the test-pattern-mode inputting step, for example, setting of composite modes is not limited to the composite mode having seven combinations for each dot size of a black ink K described in the first embodiment. It is possible to employ a configuration in which a user sets another composite mode.

For example, in addition to seven combinations illustrated in FIG. 5, it is possible to additionally set a combination in which the dot size of one ink from among an ink of cyan C, an ink of magenta M, and an ink of yellow Y has a small size, and the dot sizes of the remaining two inks have a middle size or a large size. A patch image including a second print image G2 with the additionally set composite mode is printed on the test pattern.

In addition, the test-pattern-mode inputting step allows a user to select setting of array of patch images, for example, between a case where the test pattern is printed using array of patch images illustrated in FIG. 8 and a case where the test pattern is printed using array of patch images illustrated in FIG. 11 according to the third embodiment.

In addition, in the test-pattern-mode inputting step, for example, as for the setting of the arrangement of the first print image G1 and the second print image G2 in a patch image, it is possible to set the width, in other words, the number of dot rows in a direction intersecting the relative movement direction of the first print image G1 and the second print image G2 in a patch image illustrated in FIG. 8, in other words, in the X-axis direction.

Furthermore, for example, it is possible to set the first print image G1 and the second print image G2 so as to be arranged in an alternate manner such as a checker flag.

According to the present embodiment, the test-pattern-mode inputting step is included, allowing a user to change printing parameters for a test pattern. This improves convenience for the user.

5. Fifth Embodiment

The first embodiment describes an example in which the printer 100 is a line-head-type inkjet printer. However, the printer 100 may be a serial-head-type inkjet printer.

In the case of a serial-head-type inkjet printer, the relative movement direction is a scanning movement direction of the serial head with respect to the printing medium 5, rather than in the transport direction of the printing medium 5.

In a case of interlace printing using a serial head, it is possible to complement a pixel that is not formed due to defect in discharging a black ink K, by normally discharging an ink using a nozzle of black K at a different path. However, in a case of band printing, this is not possible. In this case, it is possible to perform complement using composite black Bk described in the first embodiment.

In addition, even in a case of the interlace printing, it is possible to use composite black Bk to complement a pixel that is not formed due to defect in discharging a black ink K when this pixel cannot be complemented by normal discharge of an ink using a nozzle of black K at a different path.

Thus, even in a case of the serial-head-type inkjet printer, it is possible to obtain an effect similar to that of the first embodiment at the time of printing by using composite black Bk to complement black K.

6. Sixth Embodiment

The first embodiment describes an example of the printer 100 that employs an ink set of four colors in which black K is added to an ink set of three colors including cyan C serving as a cyan-based ink, magenta M serving as a magenta-based ink, and yellow Y serving as a yellow-based ink. However, the ink set is not limited to this. For example, it may be possible to use an ink set in which, in addition to these inks, gray LK, light cyan LC serving as cyan-based ink, light magenta LM serving as a magenta-based ink, light yellow LY serving as a yellow-based ink, or the like is added.

In addition, these inks may also be added to the ink that generates the composite black Bk.

7. Seventh Embodiment

The first embodiment describes a printing method configured to perform printing such that, when a nozzle 74, which is part of the plurality of nozzles 74 that discharge ink droplets of black K included in the printing head 13, becomes defective in discharging, composite black Bk is used to complement a dot-missing pixel occurring in the transport direction of the printing medium 5. However, this printing method is not limited to printing perform such that composite black Bk is used to complement part of a dot-missing pixel of black K as described above.

For example, it may be possible to employ a printing method configured to perform printing such that, when a black ink K dries up, composite black Bk is used to complement all the dots of black K.

In this case, a patch image of a test pattern only includes the second print image G2 with varied composite modes. A user selects a patch image with a composite mode determined to be the most favorable, which makes it possible to perform more appropriate printing.

What is claimed is:

1. A printing method for printing a print image using a plurality of dots formed by discharging, by a printing head, an ink droplet on a printing medium while relatively moving the printing head and the printing medium in a relative movement direction, the printing head being configured to discharge, on the printing medium, a black ink and inks of a plurality of colors each as the ink droplet, the printing method comprising:
- a test pattern printing step of printing a test pattern having a plurality of patch images using different composite mode for each of the dot sizes of the black ink to be complemented, the composite mode being a combination of a dot size of each of the inks of the plurality of colors used to generate composite black that complements the black, the composite black being obtained by combining ink droplets of the discharged inks of the plurality of colors;
- automatic selection step of capturing the printed test pattern as image data, and selecting, as a desired patch image, a patch image for which a difference in color between the black and the composite black is determined to be minimum by image processing, the selection being made from among the plurality of patch images included in the printed test pattern, the selection being made for each of the dot sizes of the black ink to be complemented; and
- a printing step of performing printing while complementing the black to be complemented with the composite black generated on a basis of the composite mode corresponding to the desired patch image selected correspondingly to the dot size of the black ink to be complemented.

2. The printing method according claim 1, wherein
printing is performed while complementing, with the composite black, a dot-missing pixel occurring when part of a plurality of nozzles of the printing head that discharge an ink droplet of the black ink have discharge defect, and
the patch images printed in the test pattern printing step is a print image including a first print image and a second print image that are alternately arranged in a direction intersecting the relative movement direction, the first print image including dots of the black ink and including a plurality of dot rows extending in the relative movement direction, the second print image including the composite black and including a complementary pixel row extending in the relative movement direction.

3. The printing method according to claim 2, wherein
the printing head is configured to form a dot having a small size and a dot having a middle size greater than the small size, for each of the black ink and the inks of the plurality of colors,
the inks of the plurality of colors for generating the composite black include a cyan-based ink, a magenta-based ink, and a yellow-based ink,
the test pattern includes a first test pattern when the dot size of the black ink to be complemented has the small size, and a second test pattern when the dot size of the black ink to be complemented has the middle size,
the first test pattern includes:
the patch image including:
the first print image including the dot of the black ink having the small size; and
the second print image including the composite black generated using the composite mode in which dot sizes of the cyan-based ink, the magenta-based ink, and the yellow-based ink all have the small size; and
the patch image including:
the first print image including the dot of the black ink having the small size; and
the second print image including the composite black generated using the composite mode in which dot sizes of two inks from among the cyan-based ink, the magenta-based ink, and the yellow-based ink have the small size, and a dot size of a remaining one ink has the middle size, and
the second test pattern includes:
the patch image including:
the first print image including the dot of the black ink having the middle size; and
the second print image including the composite black generated using the composite mode in which dot sizes of the cyan-based ink, the magenta-based ink, and the yellow-based ink all have the middle size; and
the patch image including:
the first print image including the dot of the black ink having the middle size; and
the second print image including the composite black generated using the composite mode in which dot sizes of two inks from among the cyan-based ink, the magenta-based ink, and the yellow-based ink have the middle size, and a dot size of a remaining one ink has the small size.

4. The printing method according to claim 2, wherein
the printing head is configured to form a dot having a small size, a dot having a middle size greater than the small size, and a dot having a large size greater than the middle size, for each of the black ink and the inks of the plurality of colors,
the inks of the plurality of colors for generating the composite black include a cyan-based ink, a magenta-based ink, and a yellow-based ink,
the test pattern includes a first test pattern when the dot size of the black ink to be complemented has the small size, a second test pattern when the dot size of the black ink to be complemented has the middle size, and a third test pattern when the dot size of the black ink to be complemented has the large size,
the first test pattern includes:
the patch image including:
the first print image including the dot of the black ink having the small size; and
the second print image including the composite black generated using the composite mode in which dot sizes of the cyan-based ink, the magenta-based ink, and the yellow-based ink all have the small size; and
the patch image including:
the first print image including the dot of the black ink having the small size; and
the second print image including the composite black generated using the composite mode in which dot sizes of two inks from among the cyan-based ink, the magenta-based ink, and the yellow-based ink have the small size, and a dot size of a remaining one ink has the middle size or the large size,
the second test pattern includes:
the patch image including:
the first print image including the dot of the black ink having the middle size; and
the second print image including the composite black generated using the composite mode in which dot sizes of the cyan-based ink, the magenta-based ink, and the yellow-based ink all have the middle size; and
the patch image including:
the first print image including the dot of the black ink having the middle size; and the second print image including the composite black generated using the composite mode in which dot sizes of two inks from among the cyan-based ink, the magenta-based ink, and the yellow-based ink have the middle size, and a dot size of a remaining one ink has the small size or the large size, and the third test pattern includes:

the patch image including:

the first print image including the dot of the black ink having the large size; and the second print image including the composite black generated using the composite mode in which dot sizes of the cyan-based ink, the magenta-based ink, and the yellow-based ink all have the large size; and the patch image including:

the first print image including the dot of the black ink having the large size; and the second print image including the composite black generated using the composite mode in which dot sizes of two inks from among the cyan-based ink, the magenta-based ink, and the yellow-based ink have the large size, and a dot size of a remaining one ink has the middle size or the small size.

5. The printing method according to claim 2, wherein in the test pattern printing step, the patch images are printed so as to be arranged in one line in the relative movement direction, and the second print image in each of the patch images arranged in one line is printed at a same position in a direction intersecting the relative movement direction.

6. The printing method according to claim 2, comprising:

before the test pattern printing step, a test pattern inputting step in which a setting of at least one of the composite mode, an alignment of the patch images, and an arrangement of the first print image and the second print image in the patch image is capable of inputting as a setting of a printing parameter for the test pattern.

* * * * *